United States Patent
Alaimo et al.

(10) Patent No.: US 11,274,693 B2
(45) Date of Patent: Mar. 15, 2022

(54) FASTENER RETENTION MATERIAL AND METHOD

(71) Applicants: Akzo Nobel Coatings International B.V., Arnhem (NL); NYLOK LLC, Macomb, MI (US)

(72) Inventors: Gregory Alaimo, Shelby Township, MI (US); Dominic J. Gradozzi, Kentwood, MI (US)

(73) Assignees: Akzo Nobel Coatings International B.V., Amsterdam (NL); Nylok LLC, Macomb, MI (US)

( * ) Notice: Subject to any disclaimer, the term of this patent is extended or adjusted under 35 U.S.C. 154(b) by 0 days.

(21) Appl. No.: 16/333,016

(22) PCT Filed: Sep. 12, 2017

(86) PCT No.: PCT/EP2017/072901
§ 371 (c)(1),
(2) Date: Mar. 13, 2019

(87) PCT Pub. No.: WO2018/050641
PCT Pub. Date: Mar. 22, 2018

(65) Prior Publication Data
US 2019/0277326 A1     Sep. 12, 2019

Related U.S. Application Data

(60) Provisional application No. 62/395,148, filed on Sep. 15, 2016.

(30) Foreign Application Priority Data

Dec. 13, 2016 (EP) .................... 16203646

(51) Int. Cl.
*F16B 33/06* (2006.01)
*C09D 5/03* (2006.01)
*C09D 177/04* (2006.01)
*C08K 3/26* (2006.01)
*C08K 3/36* (2006.01)

(52) U.S. Cl.
CPC ............ *F16B 33/06* (2013.01); *C08K 3/26* (2013.01); *C08K 3/36* (2013.01); *C09D 5/031* (2013.01); *C09D 177/04* (2013.01); *C08K 2003/265* (2013.01); *C08L 2205/18* (2013.01)

(58) Field of Classification Search
CPC ..................................................... F16B 33/06
See application file for complete search history.

(56) References Cited

U.S. PATENT DOCUMENTS

| | | | |
|---|---|---|---|
| 4,100,882 A | 7/1978 | Duffy et al. | B05C 7/02 |
| 4,702,939 A * | 10/1987 | Miyauchi | G02C 5/2281 |
| | | | 427/195 |
| 4,835,819 A | 6/1989 | Duffy et al. | B05D 1/02 |
| 5,731,043 A | 3/1998 | Horinka et al. | |
| 5,868,842 A | 2/1999 | Chung | B05B 7/06 |
| 6,554,903 B1 | 4/2003 | Sessa | B05B 13/06 |
| 2001/0028834 A1 | 10/2001 | Wallace et al. | F16B 39/22 |
| 2003/0085384 A1 | 5/2003 | Burnell-Jones | |
| 2004/0204531 A1 | 10/2004 | Baumann et al. | |
| 2008/0132606 A1 | 6/2008 | Dotterrer et al. | |
| 2008/0166496 A1* | 7/2008 | Monsheimer | C08K 3/04 |
| | | | 427/510 |
| 2009/0019647 A1 | 1/2009 | Frazee et al. | |
| 2009/0131569 A1* | 5/2009 | Schwitter | C08L 77/00 |
| | | | 524/423 |
| 2010/0113670 A1 | 5/2010 | Audenaert et al. | C09D 177/99 |

FOREIGN PATENT DOCUMENTS

| | | |
|---|---|---|
| EP | 1443073 A1 | 8/2004 |
| GB | 1417123 A | 12/1975 |
| GB | 1579355 | 11/1980 |
| TW | 514559 B | 12/2002 |
| WO | 2007/108838 A2 | 9/2007 |

OTHER PUBLICATIONS

European Search Report of corresponding EP Application No. 16203646.1 dated Jun. 21, 2017.
Notification of Transmittal of the International Search Report and the Written Opinion of the International Searching Authority, for International Application No. PCT/EP2017/072901, dated Nov. 16, 2017.

* cited by examiner

*Primary Examiner* — Robert A Vetere
(74) *Attorney, Agent, or Firm* — Monique Raub

(57) ABSTRACT

The present disclosure concerns a powder fastener retention material for application to metal sub-miniature fasteners formulated from a nylon 11 powder having a median average particle size by volume of more than 67 and less than 80 micrometers, a metal sub-miniature fastener having a patch of the reusable fastener retention material, a method for forming a patch of the fastener retention material on a metal sub-miniature fastener, a method of forming a reusable fastener retention patch on a region of a metal sub-miniature fastener, and a kit of parts comprising (a) a metal sub-miniature fastener, and (b) a powder retention material powder.

16 Claims, No Drawings

FASTENER RETENTION MATERIAL AND METHOD

This application is a national stage filing under 35 U.S.C. § 371 of PCT/EP2017/072901, filed Sep. 12, 2017, which claims priority to U.S. Patent Application No. 62/395,148, filed Sep. 15, 2016, and European Patent Application No. 16203646.1 filed Dec. 13, 2016, the contents of which are each incorporated herein by reference in their entireties.

BACKGROUND

The present disclosure relates to a powder fastener retention material for application to metal sub-miniature fasteners, a metal sub-miniature fastener comprising a patch of reusable fastener retention material, a method for forming a patch of fastener retention material on a metal sub-miniature fastener, a use of a powder fastener retention material for forming a reusable fastener retention patch on a region of a metal sub-miniature fastener, and a kit of parts comprising (a) a metal sub-miniature fastener, and (b) a powder retention material powder.

For decades, reusable fastener retention elements have taken the form of phenolic fiber or polymer "plugs" or "strips" that were mechanically inserted into holes or slots machined into the fasteners. While such processes function well to provide reusable fastener retention elements, removing metal from the fasteners can weaken the fasteners. It is also a costly and time consuming process and as such the cost of the final product is quite high.

To overcome the cost and time restraints of these known processes, the inventors have developed a thermoplastic powder fastener retention material comprising polyamide (nylon) which can be applied as a "patch" on the thread of the fasteners. Once such topically-applied element uses PA11, also known as nylon 11 and is commercially available from Nylok LLC of Macomb, Mich. It was found that the introduction of the topically-applied patch was an improvement in terms of production efficiency, processing speeds, and production costs.

This material was selected because of its advantageous characteristics. It has a relatively low melting point (about 376 F) and has very good melt-flow characteristics. Good melt-flow characteristics means that it melts to form a relatively low viscosity liquid which produces a smooth, shiny, attractive deposition. In addition, nylon 11 is unique among thermoplastic polymers in that it is extremely resilient and non-relaxing. When tightly compressed in the interface between a male and female thread, nylon 11 will not cold-flow, extrude, or take a compression-set. When compressed in this manner, it continues to provide a spring-like counterforce between the male and female threads which promotes very tight metal-to-metal contact within the bolted joint (on a side of the joint opposite to that of the "patch"). It is this metal-to-metal contact that provides the locking action.

Attempts have been made to use other materials for reusable fastener retention elements, such as PA12 (nylon 12) and nylon 6-6, however, none of these materials have the beneficial characteristics of nylon 11 mentioned above.

Although nylon 11 functions well to provide a reusable retention element, there are often drawbacks when being applied to a sub-miniature fastener. Previously it was thought that finer grade nylon 11 (i.e. having smaller median average particle size) would be most suitable for sub-miniature fasteners which have fine/finer threads. Issues, however arise due to the chemical and mechanical properties of the material. For example, a finer grade material will melt faster than a coarser grade material. This is due to the larger surface area and larger surface area to volume ratio of the material. As such, finer grade materials may flow to too great an extent and not adequately provide the desired "patch" effect and configuration (e.g., size, thickness and the like). Fasteners are sometimes reused. It is important that the fastener retention material adheres to the fastener even after one or more uses. The ability of the fastener retention material to adhere to the fastener was found to be inadequate if the particle size of the nylon is too big or too small.

Previous efforts, as described in GB 1579355, disclose the application of locking patches of resilient resin to articles (such as nuts) having an internally threaded portion and openings at both ends of the threaded portion. The resin is a mixture of powdered polyamide resin (Nylon 11) and epoxy resin, where the mixture has a particle size distribution of less than 2% retained on a No. 70 Sieve (210 microns), about 90% retained on a No. 140 Sieve (105 microns), and about 5% passing on a No. 325 Sieve (44 microns). The resin mixture described in this reference is applied using large application tubes in an induction heating process with large volumes of compressed air. This application process would completely blow much smaller, sub-miniature fasteners off the conveying belt and would not melt properly, since the ability for the fasteners to hold heat during the induction process is directly proportional to the mass of the fastener.

Additionally, the resin mixture described in this reference would not provide a low enough viscosity, adequate adhesion, fast enough melting, particle spacing, and many other of the characteristics needed for successful application to the very small, sub-miniature fasteners as described herein. Furthermore, the sizes of the particles of the resin mixture are larger than the sub-miniature fasteners described herein.

Moreover, finer grade materials do not flow as well as coarser grade materials, when in the form of a granular powder. That is, finer materials tend to clump when conveyed (again, when in solid form), thus making the application process more difficult to control. When coarse grade material is used with larger fasteners and fasteners with wider threads, the rapid melting and solid flow are not issues. However with smaller fasteners and finer thread fasteners, these issues have a greater impact on production and retention element quality and consistency.

Today's electronic devices are becoming smaller while incorporating the functions that support a modern-day lifestyle. For example, functions previously performed by laptop computers and pads or tablets are now available in smaller mobile phones, and functions previously available in pocket-sized mobile phones and tablets are now available in watches. As the sizes of devices shrink, so too must the internal components and the physical support systems for these components.

Although devices are getting smaller, the need to maintain components in place and the need for structural and conjoined integrity has not changed. In fact, many such smaller devices require an even higher level of assurance that components are well supported and fastened to one another and/or a support system, such as an assembly or subassembly. This is particularly so for small devices such as mobile phones and watches, that are not readily opened and/or repaired without specialized facilities.

The size of fastener may be identified according to international standard ISO 68-1. According to this standard, an M0.5 fastener has a "major diameter" (diameter from furthest points on the thread) of 0.5 mm, a M1.0 fastener has a major diameter of 1.0 mm and a M1.1 fastener has a major diameter of 1.1 mm and so forth. A sub-miniature fastener is a threaded fastener having a major diameter of less than about 1.1 mm, such as 1 mm (M1.0 fastener), 0.8 mm (M0.8 fastener) and 0.5 mm (M0.5 fastener).

Powder fastener retention material traditionally used on larger fasteners is too coarse for use on sub-miniature fasteners because it does not flow well into the threads to form a patch. When finer powders are used, the powders tended to clump or agglomerate during the application process and were susceptible to changes in humidity, resulting in less than acceptable coating and increased processing demands and issues, for example due to powder agglomeration.

Accordingly, there is a need for a material that can be used to secure sub-miniature fasteners in place in an assembly. Desirably, such a material is a reusable material. By "reusable", it is meant that is the fastener can be installed, removed and reinstalled without reapplying the material, while the material retains its retention characteristics. More desirably still, such a material maintains good flow characteristics during application/processing, has good melt-flow characteristics so as to provide a retention element "patch" within desired and acceptable processing parameters, and has good adhesion to the fastener after it has been used at least twice, preferably more than twice, and maintains desirable installation and prevailing torque values in repeated fastener installations and removals.

SUMMARY

The present disclosure provides a powder fastener retention material for application to metal sub-miniature fasteners, a metal sub-miniature fastener comprising a patch of reusable fastener retention material, a method for forming a patch of fastener retention material on a metal sub-miniature fastener, a use of a powder fastener retention material for forming a reusable fastener retention patch on a region of a metal sub-miniature fastener, and a kit of parts comprising (a) a metal sub-miniature fastener, and (b) a powder retention material powder.

In a first embodiment, there is provided a powder fastener retention material for application to metal sub-miniature fasteners, wherein such sub-miniature fasteners are threaded fasteners having a diameter from furthest points on the thread of less than about 1.1 mm, comprising a nylon 11 powder having a median average particle size by volume of more than 67 and up to 80 micrometers, and further comprising up to 20 wt % of a density control additive, up to 40 wt % of an adhesion promoter, and up to 2 wt % a flow promoter, wherein wt % is based on the total weight of the powder.

The median particle size by volume may be measured by Malvern Instruments Mastersizer 2000 version 5.60.

"Micrometers" may otherwise be referred to as "microns".

For the avoidance of doubt, a powder fastener retention material for application to metal sub-miniature fasteners should be understood as a powder fastener retention material "suitable for|" application to metal sub-miniature fasteners.

Ideally at least 60% by volume of the nylon 11 particles have a particle size of between 30 and 100 micrometers. In addition, preferably at least 80% by volume of the particles have a particle size between 20 and 130 micrometers. The particle size distribution may be measured by Malvern Instruments Mastersizer 2000 version 5.60.

The nylon 11 powder may have a median average particle size by volume of between about 67 and about 73 micrometers.

The powder fastener retention material comprises up to 20 wt % of a density control additive, wherein wt % is based on the total weight of the powder. The density control additive controls the density of the powder retention material. In one example, the density control additive is limestone. For example, the powder fastener retention material may comprise about 10 wt % to about 20 wt % of limestone.

The powder fastener retention material comprises up to 50 wt % of an adhesion promoter wherein wt % is based on the total weight of the powder. The powder fastener retention material may alternatively comprise up to 30 wt % of an adhesion promoter, or up to 20 wt % or up to 10 wt % of adhesion promoter, wherein wt % is based on the total weight of the powder.

In one example, the adhesion promoter is a phenol-functional compound and/or an epoxy functional compound.

The adhesion promoter may comprise at least one of the following: phenol; 4, 4'-(1-methylethylidene) bis-phenol, 2.2'-[(1-methylethylidene) bis (4,1-phenyleneoxymethylene)] bis [oxirane].

The powder fastener retention material comprises up to 5 wt % of a flow promoter wherein wt % is based on the total weight of the powder. Alternatively, the powder fastener retention material may comprise up to 3 wt % or up to 2 wt % or up to 1 wt % of a flow promoter wherein wt % is based on the total weight of the powder.

Examples of the flow promoter are crystalline silica and amorphous silica.

The powder fastener retention material may comprise at least one colouring pigment. In one example, the pigment is non-reactive. Optionally the color of the pigment is blue.

Another embodiment relates to a metal sub-miniature fastener comprising a patch prepared from a fastener retention material comprising a nylon 11 powder having a median average particle size by volume of more than 67 and less than 80 micrometers (the fastener retention material as further defined herein). The metal sub-miniature fastener is a threaded fastener having a diameter from furthest points on the thread of less than about 1.1 mm, i.e. the the metal sub-miniature fastener has a major diameter of less than about 1.1 mm by ISO 68-1. Ideally least 60% by volume of the particles have a particle size between about 30 and 100 micrometers.

In another embodiment there is a method for forming a patch of fastener retention material on a metal sub-miniature fastener, comprising:

(a) applying to at least one region of the metal sub-miniature fastener, wherein such sub-miniature fasteners are threaded fasteners having a diameter from furthest points on the thread of less than about 1.1 mm, a powder retention material in a gaseous stream, and (b) melting the powder retention material on the metal sub-miniature fastener, wherein the powder retention material comprises a nylon 11 powder having a median average particle size by volume of more than 67 and less than 80 micrometers, and further comprising up to 20 wt % of a density control additive, up to 40 wt % of an adhesion promoter, and up to 2 wt % a flow promoter, wherein wt % is based on the total weight of the powder.

The method may further comprise a step of pre-heating the metal sub-miniature fastener prior to application of the powder retention material to the metal sub-miniature fastener and/or a step of post-heating the metal sub-miniature fastener after application of the powder retention material to the metal sub-miniature fastener.

A sub-miniature faster has a major diameter of 1.1 mm or less as determined by ISO 68-1. Ideally at least 60% by volume of the particles have a particle size between 30 and 100 micrometers.

Another embodiment, is the use of a powder fastener retention material for forming a reusable fastener retention patch on a region of a metal sub-miniature fastener, wherein such sub-miniature fasteners are threaded fasteners having a diameter from furthest points on the thread of less than about 1.1 mm, wherein the powder retention material comprises a nylon 11 powder having a median average particle size by volume of more than 67 and less than 80 micrometers, and further comprising up to 20 wt % of a density control additive, up to 40 wt % of an adhesion promoter, and up to 2 wt % a flow promoter, wherein wt % is based on the total weight of the powder Typically, the powder fastener retention material is used according to the following method.

The method of forming a reusable fastener retention patch on a region of a metal sub-miniature fastener comprises:
(a) applying to at least one region of the metal sub-miniature fastener, a powder retention material in a gaseous stream, wherein such sub-miniature fasteners are threaded fasteners having a diameter from furthest points on the thread of less than about 1.1 mm, and
(b) melting the powder retention material on the metal sub-miniature fastener, wherein the powder retention material comprises a nylon 11 powder having a median average particle size by volume of more than 67 and less than 80 micrometers, and further comprising up to 20 wt % of a density control additive, up to 40 wt % of an adhesion promoter, and up to 2 wt % a flow promoter, wherein wt % is based on the total weight of the powder.

The method may further comprise a step of preheating the metal sub-miniature fastener prior to application of the powder retention material to the metal sub-miniature fastener and/or a step of post-heating the metal sub-miniature fastener after application of the powder retention material to the metal sub-miniature fastener.

A sub-miniature faster has a major diameter of less than about 1.1 mm as determined by ISO 68-1. Ideally, at least 60% by volume of the particles have a particle size between 30 and 100 micrometers.

In another embodiment, there is provided a kit of parts comprising:
(a) a metal sub-miniature fastener, wherein such sub-miniature fasteners are threaded fasteners having a diameter from furthest points on the thread of less than about 1.1 mm and
(b) a powder retention material powder comprising a nylon 11 powder having a median average particle size by volume of more than 67 and less than 80 micrometers, and further comprising up to 20 wt % of a density control additive, up to 40 wt % of an adhesion promoter, and up to 2 wt % a flow promoter, wherein wt % is based on the total weight of the powder.

Thus the metal sub-miniature fastener has a major diameter of less than about 1.1 mm as determined by ISO 68-1. Ideally, at least 60% by volume of the particles have a particle size between 30 and 100 micrometers.

These and other features and advantages of the present disclosure will be apparent from the following detailed description, in conjunction with the appended claims.

DETAILED DESCRIPTION

While the present disclosure is susceptible of embodiments in various forms, there is described a presently preferred embodiment with the understanding that the present disclosure is to be considered an exemplification and is not intended to limit the disclosure to the specific embodiment illustrated.

The powder fastener retention material comprising nylon 11 (PA11) is supplied in the form of a powder. During processing (i.e., application to a fastener) one option is to pre-heat the fastener to a temperature of about 525° F. to 550° F. using, for example, an induction heater. A spray of powder fastener retention material and a gas, such as air would then be directed against the fastener in the area where the retention element is desired. The powder fastener retention material melts on contact with the preheated fastener to form a topically-applied retention element that takes the form of a patch. The low melt-viscosity of the nylon, allows the powder fastener retention material to spread and flow. Shortly after it is applied, usually within seconds after application and melting, the liquefied powder fastener retention material cools and solidifies forming the retention element.

Powder fastener retention materials are provided in several different grades depending on particle size. The particular grade of powder that is applied is dependent upon the physical size of the fastener and the coarseness of its thread. Generally, it is advantageous to apply a coarse powder to larger sizes of fasteners. Conversely, it is generally advantageous to apply finer powders to smaller fasteners.

Different grades of nylon 11 have different particles sizes. Because the different grades are chemically the same material, the melting point temperature of the materials is the same. Nevertheless, finer powders will melt faster than more coarse powders. Moreover, since the retention element is to be provided as a deposition or lump or patch of nylon on the surface of the fastener, a much greater quantity of a fine powder is needed to achieve the same size final deposition, i.e., patch. As such, there is a balance between the particle size and the rate at which the material melts so as to create the patch. Thus, more coarse powders are used on coarser threads so as to control the melt and the configuration (e.g., size, shape, thickness and the like) of the patch.

A typical coarse powder (Nylok LLC part number 76-5008) is a most widely used powder for forming reusable retention elements for fasteners from sizes M3 or M4 up to and greater than M19. The size of the powder particles is referred to as a 250 micron powder, which is an indication of the median average particle size by volume which is 250 micrometers. The actual particle size distribution follows a typical bell curve and can extend from just a few micrometers up to about 600 micrometers.

A fine powder (Nylok LLC part number 76-5010) is typically used when processing smaller fasteners from diameters M1.2 or M1.4 up to about M3. This powder, which is referred to as a 75 micron powder, has median average particle size by volume of about 75 to 80 micrometers. Again, the actual distribution may include particles ranging from a few micrometers up to about 250 micrometers or so. This particular distribution and "spread" of particle sizes functions well for such fasteners.

As the need arose for even smaller fasteners that are retained in a manner so as to be reusable, so too did the need for finer powders. Due to the size of these devices, it is desirable, if not necessary, to use fasteners as small as M0.8 and M1.0 for personal end-products such as wearable health care monitors, "smart" devices such as mobile phones, wrist watches and the like. It was, however, also found that to be effective, such retention materials desirably were softer, offered better adhesion to the fasteners, and would melt faster so as to reduce damage to decorative plating when heating fasteners. It was, however, found that commercially available nylon powders were unacceptable for use with such fine (small) fasteners. The larger particle distribution (e.g., the larger particles within the normal distribution) resulted in the more coarse particles laying on the very fine threads. Thus, acceptable retention element "patches" were not formed.

As the powders were ground finer, other problems surfaced. The resulting retention elements did not provide sufficient prevailing torque. Moreover, as noted above, the very fine powders did not flow well; rather, they tend to pack and cake together or agglomerate. As such, additives were sometimes used to enhance the powder's flow characteristics and adhesion to metal substrates.

Surprisingly, it was found that a powder fastener retention material for application to metal sub-miniature fasteners comprising a nylon 11 powder having a median average particle size by volume of more than 67 and less than 80 micrometers functioned well. The nylon 11 powder may have a median average particle size by volume of between about 67 and about 73 micrometers.

In order to enhance the characteristics needed for processing, e.g., application to fasteners in a production environment, various additives may be added to the powder fastener retention material, for example one or more of an adhesion promoter, flow promoter and density control additives.

Density control additives control the density and viscosity of the material. For example, the density control additive may be one or more of the following: calcium carbonate (chalk), barium sulfate, aluminum silicates (clay), aluminum potassium silicate (mica), magnesium silicate minerals, and limestone. Limestone, may be used, for example, in an amount of about 10 wt % to 20 wt % by weight of the powdered material (wherein wt % is based on the total weight of the powder).

Another such additive is an adhesion promotor. Adhesion promotors are added to aid the adherence of the fastener retention material to the metal sub-miniature fastener. Use of adhesion promoters enhances the ability for repeated reuse of the fastener without reapplication of the retention element material. For example, one or more of the following adhesion promotors may be used: phenol, 4, 4'-(1-methylethylidene)bis-phenol, polymer with 2.2'-[(1-methylethylidene) bis(4,1-phenyleneoxymethylene)]bis[oxirane] (also referred to as Poly(Bisphenol A-co-epichlorohydrin) glycidyl end-capped). In addition, epoxy-functional compounds (resins) may be added as an adhesion promotor.

Adhesion promoters are typically used in an amount of about 2.5 wt % to 10 wt %, wherein wt % is based on the total weight of the powder. Alternatively, the adhesion promoter is used in an amount of up to 50 wt %, up to 30 wt %, up to 20 wt % or up to 10 wt %, wherein wt % is based on the total weight of the powder.

Another such additive is a colouring pigment for providing colour to the powder fastener retention material. Colouring pigments may be used in an amount of about 0 wt % to about 1 wt % (wherein wt % is based on the total weight of the powder). Usually the pigment for providing colour, such as blue, is non-reactive.

Another such additive is a flow agent or flow promoter. Flow agents/promotors may be used in an amount of about 0 wt % to about 5 wt % (wherein wt % is based on the total weight of the powder). For example, the flow promoters/agents may be one or more of aluminum oxide and/or silica (e.g. crystalline silica or amorphous silica).

It was found that such a material in accordance with the embodiments of the present disclosure not only has the desired flow and adhesion to the metal fastener, but also has a Shore D hardness of about 70-80 which provides the softness that is desired for the patch as formed so as to conform to the spaces between threads as the fastener is inserted into a mating opening (for example, without cracking or breaking), while at the same time provides the desired physical integrity so that the patch substantially retains its shape, size and position on the fastener. The elongation of the material, as a patch is also typically about 15%, and as such, the material is resilient and durable, allowing for repeated reuse, but limiting cold flow of the material. The elongation is measured as a percentage of change in size from the initial, as applied length to the length following mating of the fastener with the opening into which it is mated.

One method of preparing a powder fastener retention material having the desired median average particle size is to melt-mix the components of the material, extrude the material, cool the material and then cryogenically grind the material to the desired particle size. This process ensures that each particle of the finished powder has exactly the same content and consistency, and allows the powder to be reclaimed and recycled during factory processing, while preventing the powder from separating into its individual components. Essentially, the components that make up the material are mixed together, melted and extruded into pellets. The pellets are then cooled, and cryogenically ground. This process ensures much greater consistency in particle size and distribution than a simple dry-blended mix of various powders.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that the relative directional terms such as sides, upper, lower, top, bottom, rearward, forward and the like are for explanatory purposes only and are not intended to limit the scope of the disclosure. From the foregoing it will be observed that numerous modifications and variations can be effectuated without departing from the true spirit and scope of the novel concepts of the present disclosure.

It is to be understood that no limitation with respect to the specific embodiments illustrated is intended or should be inferred. The disclosure is intended to cover by the appended claims all such modifications as fall within the scope of the claims.

Examples

The disclosure will be elucidated with reference to the following examples. These are intended to illustrate the material but are not to be construed as limiting in any manner the scope thereof.

Flow Test. The flow of the powder material to be applied to the subminiature fastener was determined by placing approximately a 0.5 kg sample into a vibratory bowl feeder. The samples are evaluated for fluid like appearance and particle movement. The closer the flow characteristics are to a liquid, the higher the performance rating. When the material behaves like a solid or becomes caked the product will not feed through the vibratory bowl feeder. The volume of product that flows through the system is then weighed and compared to the initial quantity presented for delivery. A score of 1 to 5 was given to each sample based on transfer volume.

| Score | % transfer volume |
|---|---|
| 1 | <92% (poor) |
| 2 | 94% |
| 3 | 96% |
| 4 | 98% |
| 5 | 100% (superior) |

Torque Test. The prevailing torque of the fastener is measured using a digital torque screwdriver (Standard Method IFI-524). In conducting the torque test, a sub-miniature fastener with a patch applied thereto is installed into and removed from a secured mating element, such as a nut secured in a plate, in a series of 5 installations and removals. The torque required to remove the fastener (the prevailing torque) is recorded. As will be recognized by those skilled in the art, the first installation and prevailing torque values will be highest and the values will drop off with each successive installation and removal. A sample was considered to pass the torque tests when torque values in the range of 0.08±0.04 kgf-cm to 0.14±0.07 kgf-cm are exhibited.

Adhesion Test. The adhesion of the patch applied to the sub-miniature fastener was determined on the fasteners following the torque test noted above. This test is carried out manually using a pick or sharp instrument to manually pick or remove the material from the fastener threads. When the material resists or is difficult to remove, for example, if the material tears or comes out in small pieces with while remaining substantially adhered to the fastener, then the adhesion is considered high. Conversely, when the material is readily removed from the fastener threads, for example, when the material comes off of the fastener threads in one long spiral, then the adhesion is considered low. Thus, if the coating remains completely or substantially completely on the threads of the fastener after the 5th removal the adhesion is rated at the highest level. A score of 1 to 5 was given to each sample tested. The highest score (5) was given to the best adhesion. The lowest score (1) was given to the worst adhesion.

Particle size measurement. The median average particle size of the nylon 11 is the median particle size by volume in micrometers as measured by Malvern Instruments Mastersizer 2000 version 5.60.

Example 1: Preparation of Fastener Retention Material

An intermediate composition was first prepared by blending the nylon 11 resin (83 wt %), limestone, silica and other pigments (total 17 wt %). In order to achieve the desired particle size distribution, the mixture was then melt mix extruded at 400° F. with the extrudate strands drawn through a water bath and into a pelletizer. The pellets were then cryogenically ground and sifted to produce powder with particles having the desired median average particle size of 67-73 micrometers. More than 60% by volume of the particles had a particle size of between 30 and 100 micrometers. More than 80% by volume of the particles had a particle size between 20 and 130 micrometers. The intermediate powder (90 wt %) was then blended with an epoxy functional adhesion promotor, further flow promotor, and an additional pigment (total of 10 wt %) in a Henschell mixer, then sifted to remove any particles of an unwanted size. Adhesion, flow control and torque of the faster material was then determined in accordance with the above-described tests. The results of the tests are provided in Table 1.

Examples 2 to 6: Preparation of Fastener Retention Material

Examples 2 to 6 were prepared according to the same process as described for Example 1 except the nylon 11 resin was cryogenically ground and sifted to produce powder with particles having a different median particle size and particle size distributions as shown in Table 1. The amount of flow promotor and epoxy functional adhesion promotor added to the nylon was varied as shown in Table 1. For each of the samples, adhesion, flow control and torque of the fastener material was determined in accordance with above-described tests.

The results of the tests are provided in Table 1 Test Results—

TABLE 1

| Example | Median Average Particle size by volume (micrometers) | % of nylon 11 particles particle size between 30 and 100 micrometers | Wt % of flow promotor (silica) | Wt % of epoxy - functional adhesion promotor | Flow Control of powder Score (1 to 5) | Adhesion Score (1 to 5) | Pass torque test |
|---|---|---|---|---|---|---|---|
| 1 | 67-73 | >60% | 0.2 | 10 | 5 | 5 | Pass |
| 2 | 75-80 | >60% | 2 | 40 | 4 | 3 | Fail |
| 3 | 25-30 | <60% | 0.1 | 10 | 1 | 2 | Fail |
| 4 | 25-30 | <60% | 0.1 | 20 | 1 | 2 | Fail |
| 5 | 60-65 | <60% | 0.1 | 10 | 2 | 4 | Fail |
| 6 | 90-110 | >60% | 0.1 | 10 | 4 | 4 | Fail |

Results show Example 1 which contains nylon 11 powder having a median average particle size by volume of more than 67 and up to 73 micrometers has the best adhesion and flow properties and also passes the torque test.

Despite the fact that Example 2 contains more flow promotor than Example 1, the flow control of Example 1 is superior to that of Example 2. This shows that the addition of more flow promotor is not necessarily the primary driving force in achieving flow characteristics. The inventors have concluded that the particle size distribution of Example 1 is the most preferred.

Examples 3 to 6 are comparative examples. All of these examples have a median average particle size by volume of less than 67 micrometers or more than 80 micrometers. In addition less than 60% by volume of the particles have a particle size outside the range of 30 and 100 micrometers. All of the examples show worse adhesion and flow control than Examples 1 and 2. They also all fail the torque test. Even though Example 4 contains more adhesion promoter material than Example 1 it still exhibited worse adhesion. This shows that the addition of more adhesion promotor is not necessarily the primary driving force in achieving improved adhesion.

It will also be understood by those skilled in the art that the configuration of the fastener retention material patch on the sub-miniature fastener can take many forms. For example, a single patch can be formed on the fastener that extends about 90 to about 180 degrees circumferentially around the fastener shank along the threads, but that more or less circumferential extent of the patch may be present. The patch may extend fully or substantially fully along the length of the threads or only partially along the length of the threads as desired. In addition, more than one patch may be present in which the multiple patches are positioned equally or substantially equally, longitudinally along the shank of the fastener or longitudinally staggered from one another. All such configurations and applications of the fastener retention material patch or patches are within the scope and spirit of the present disclosure.

The invention claimed is:

1. A powder fastener retention material for application to metal sub-miniature fasteners, wherein such sub-miniature fasteners are threaded fasteners having a diameter from furthest points on the thread of less than about 1.1 mm, comprising a nylon 11 powder having a median average particle size by volume of between 67 and 73 micrometers, and further comprising up to 20 wt % of a density control additive, up to 40 wt % of an adhesion promoter, and up to 2 wt % a flow promoter, wherein wt % is based on the total weight of the powder fastener retention material.

2. The powder fastener retention material of claim 1 wherein at least 60% by volume of the nylon 11 particles have a particle size of between 30 and 100 micrometers.

3. The powder fastener retention material of claim 1, wherein the density control additive comprises limestone.

4. The powder fastener retention material of claim 1, wherein the adhesion promoter comprises a phenol-functional compound and/or an epoxy functional compound.

5. The powder fastener retention material of claim 1, wherein the flow promoter comprises silica.

6. A metal sub-miniature fastener comprising a patch prepared from a powder fastener retention material comprising a nylon 11 powder having a median average particle size by volume of between 67 and 73 micrometers, wherein such a sub-miniature fastener is a threaded fastener having a diameter from furthest points on the thread of less than about 1.1 mm.

7. The metal sub-miniature fastener of claim 6 wherein at least 60% by volume of the nylon 11 particles have a particle size of between 30 and 100 micrometers.

8. The metal sub-miniature fastener of claim 6, wherein the powder fastener retention material further comprises up to 20 wt % of a density control additive, up to 40 wt % of an adhesion promoter, and up to 2 wt % a flow promoter, wherein wt % is based on the total weight of the powder fastener retention material.

9. The metal sub-miniature fastener of claim 8, wherein the density control additive comprises limestone.

10. The metal sub-miniature fastener of claim 8, wherein the adhesion promoter comprises a phenol-functional compound and/or an epoxy functional compound.

11. The metal sub-miniature fastener of claim 8, wherein the flow promoter comprises silica.

12. A method for forming a patch of fastener retention material on a metal sub-miniature fastener, comprising:
(a) applying to at least one region of the metal sub-miniature fastener a powder retention material in a gaseous stream, wherein such sub-miniature fasteners are threaded fasteners having a diameter from furthest points on the thread of less than about 1.1 mm, and
(b) melting the powder retention material on the metal sub-miniature fastener, wherein the powder retention material comprises a nylon 11 powder having a median average particle size by volume of between 67 and 73 micrometers, and further comprising up to 20 wt % of a density control additive, up to 40 wt % of an adhesion promoter, and up to 2 wt % a flow promoter, wherein wt % is based on the total weight of the powder retention material.

13. The method of claim 12 further comprising a step of preheating the metal sub-miniature fastener prior to application of the powder retention material to the metal sub-miniature fastener, and/or a step of post-heating the metal sub-miniature fastener after application of the powder retention material to the metal sub-miniature fastener.

14. The method of claim 12 wherein at least 60% by volume of the nylon 11 particles have a particle size of between 30 and 100 micrometers.

15. Use of a powder fastener retention material for forming a reusable fastener retention patch on a region of a metal sub-miniature fastener, wherein such sub-miniature fasteners are threaded fasteners having a diameter from furthest points on the thread of less than about 1.1 mm, wherein the powder fastener retention material comprises a nylon 11 powder having a median average particle size by volume of between 67 and 73 micrometers, and further comprising up to 20 wt % of a density control additive, up to 40 wt % of an adhesion promoter, and up to 2 wt % a flow promoter, wherein wt % is based on the total weight of the powder fastener retention material.

16. A kit of parts comprising:
(a) a metal sub-miniature fastener, wherein such sub-miniature fasteners are threaded fasteners having a diameter from furthest points on the thread of less than about 1.1 mm and
(b) a powder retention material comprising a nylon 11 powder having a median average particle size by volume of between 67 and 73 micrometers, and further comprising up to 20 wt % of a density control additive, up to 40 wt % of an adhesion promoter, and up to 2 wt % a flow promoter, wherein wt % is based on the total weight of the powder retention material.

* * * * *